(12) United States Patent
Lee

(10) Patent No.: US 7,200,121 B2
(45) Date of Patent: Apr. 3, 2007

(54) METHOD OF SETTING NETWORK CONFIGURATION AND DEVICE AND SYSTEM THEREOF

(75) Inventor: Chih-Fang Lee, Tainan (TW)

(73) Assignee: Accton Technology Corporation (TW)

( * ) Notice: Subject to any disclaimer, the term of this patent is extended or adjusted under 35 U.S.C. 154(b) by 1016 days.

(21) Appl. No.: 10/160,014

(22) Filed: Jun. 4, 2002

(65) Prior Publication Data
US 2003/0189905 A1 Oct. 9, 2003

(30) Foreign Application Priority Data
Apr. 3, 2002 (TW) .............................. 91106794 A

(51) Int. Cl.
*H04L 12/28* (2006.01)
(52) U.S. Cl. .................. 370/254; 370/389; 370/395.53
(58) Field of Classification Search ................ 370/254, 370/395.53
See application file for complete search history.

(56) References Cited

U.S. PATENT DOCUMENTS

| | | | |
|---|---|---|---|
| 5,892,912 A | | 4/1999 | Suzuki et al. |
| 5,914,938 A | | 6/1999 | Brady et al. |
| 6,023,563 A | * | 2/2000 | Shani .......................... 709/249 |
| 6,223,218 B1 | * | 4/2001 | Iijima et al. ................. 709/221 |
| 6,539,019 B1 | * | 3/2003 | Noy et al. ............. 370/395.53 |
| 6,873,602 B1 | * | 3/2005 | Ambe ......................... 370/254 |
| 2003/0189905 A1 | | 10/2003 | Lee |

FOREIGN PATENT DOCUMENTS

TW 550902 9/2003

OTHER PUBLICATIONS

IEEE Standards for Local and Metropolitan Area Networks p. 198, Jul. 30, 1998.

* cited by examiner

*Primary Examiner*—Brian Nguyen
(74) *Attorney, Agent, or Firm*—Sughrue Mion, PLLC

(57) ABSTRACT

A method of setting network configuration, and the device and system implemented in a virtual LAN are disclosed. By utilizing the present invention, a network device, such as switch, which supports VLAN, can set and adjust the VLAN configuration information record dynamically according to the media access control (MAC) addresses of other network devices connected to the ports of the network device, and by detecting the plug and play signal on each port of the network device, in order to maintain and manage the VLAN conveniently.

17 Claims, 5 Drawing Sheets

METHOD OF SETTING NETWORK CONFIGURATION AND DEVICE AND SYSTEM THEREOF

FIELD OF THE APPLICATION

The present invention relates to a method of setting network configuration, and device and system thereof, and more particularly, to a method of setting network configuration applied on VLAN (Virtual Local Area Network), and the device and system thereof, thereby dynamically setting and adjusting the internal configuration of VLAN.

BACKGROUND OF THE APPLICATION

With the rapid growth of computer network, the planning and setting of computer network become more and more crucial, wherein VLAN is a LAN having the advantages of smart planning and flexible setting. VLAN is to logically connect network devices that may not be physically connected, thereby enabling the communication behaviors among the network devices to be acted as if the network devices are physically connected, so that the protocol and configuration setting of VLAN are quite different from those of conventional LANs.

The so-called VLAN configuration setting means setting the configuration of each member inside a VLAN. Currently, there are five widely- adopted approaches as listed below: 1. VLAN based on connection ports (Port-based VLAN); 2. VALN based on MAC (Media Access Control Address) addresses (MAC-based VLAN); 3. VLAN based on IP (Internet Protocol) subnets; 4. VLAN based on network layer protocols; 5. VLAN based on principles. The port-based VLAN and the MAC-based VLAN will be roughly explained hereinafter.

1. Port-based VLAN: A basic unit of VLAN member is a connection port of a network device such as a hub, a bridge and a switch, etc. Management software is used for planning what connection ports have to be included in each of the VLANs, and what members should be included in the connection ports.

Referring to FIG. 1, FIG. 1. is a schematic diagram showing conventional port-based VLANs, wherein VLAN 50, VLAN 52 and VLAN 54 are connected via a network device 10 (such as a switch), a network device 12 and a network device 14. The members of VLAN 50 comprise network devices 60, 62, 64 and 66 respectively connected to a second port 20, a third port 22, a fourth port 24 and a fifth port 26, wherein those ports are located on the network device 10. The members of VLAN 52 comprise network devices 72 and 74 respectively connected to an eleventh port 36 and a twelfth port 38, wherein those ports are located on the network device 10; and network devices 88 and 90 respectively connected to a ninth port 108 and an eleventh port 110, wherein those ports are located on the network device 14. The members of VLAN 54 comprise network devices 68 and 70 respectively connected to an eighth port 32 and a ninth port 34, wherein those ports are located on the network device 10; network devices 76, 78, 80 and 82 respectively connected to a second port 92, a fourth port 94, a sixth port 96 and an eighth port 98, wherein those ports are located on the network device 12; network devices 84 and 86 respectively connected to a fourth port 104 and a sixth port 106, wherein those ports are located on the network device 14. Moreover, a sixth port 28 of the network device 10 is connected to a twelfth port 100 of the network device 12, and, a seventh port 30 of the network device 10 is connected to a first port 102 of the network device 14.

Although it is not difficult to practice the port-based VLAN, yet there are serious defects in network security and management. For example, if the network device 60 originally configured to the second port 20 of the network device 10 is switched to the twelfth port 38, and the network device 74 originally configured to the twelfth port 38 is switched to the second port 20, then it is apparently known that the network device 60 originally associated with the VLAN 50 now belongs to the VLAN 52, and likewise, the network device 74 originally associated with the VLAN 52 now belongs to the VLAN 50. Accordingly, the VLANs with which the network devices 60 and 74 are associated are totally different from the original settings, thus causing serious loopholes occurring in network security and management.

2. MAC-based VLAN: A basic unit of VLAN member is a unique MAC address (generally is a 48-bit address) owned by each of the network devices. Similarly, management software is used for planning what MAC addresses have to be included in each of the VLANs (i.e. what network devices should be included).

Referring to FIG. 2, FIG. 2 is a schematic diagram showing conventional MAC-based VLANs, wherein a network device 200 (such as a switch) and a control device 202 are used for linking and controlling a VLAN 210 and a VLAN 212. Besides, the network device 200 has a storing device 204 used for storing the related information concerning VLANs 210 and 212 (such as VLAN configuration information). On the other hand, the storing device 204 and the control device 202 can also be built inside the network device 200, or in another network device 206.

Such as shown in FIG. 2, the VLAN 210 comprises twenty network devices connected to a second port 216 of the network device 200. Each of the twenty network devices has a different MAC address, such as the one from MAC21 to MAC40. The VLAN 212 comprises twenty network devices connected to a first port 214 of the network device 200 each of which has a different MAC address, such as from MAC1 to MAC20; and twenty network devices connected to a third port 218 of the network device 200 each of which has a different MAC address, such as from MAC41 to MAC60, wherein the VLAN 212 has forty network devices in total.

Since the information related to the layout and linking status concerning each of the network devices is stored in the network device 200, those sixty network devices can communicate to each other in accordance with various protocols. However, let's say the twenty network devices connected to the third port 218 of the network device 200 are switched to being connected to the fifth port 220 of the network device 200 or to a port of any other network device, or are directly pulled out of the third port 218 of the network device 200. Since the corresponding VLAN configuration information record inside the network device 200 is not updated dynamically, the connections among certain network devices would be interrupted, so that breakdown occurs on the logic structure of VLAN 212, thus lowering the reliability of VLAN 212 and making the maintenance and management of VLAN more difficult.

SUMMARY OF THE APPLICATION

Just as described above, when a network device in a VLAN is plugged into a port or pulled out from a port, or a port is replaced, since the VLAN configuration information record stored in a switch fails to be updated accordingly, part of the connecting paths within the VLAN is interrupted, thus making the maintenance and management of VLAN more difficult.

Therefore, it is an object of the present invention to provide a method of setting network configuration, and the device and system thereof, which can be particularly applied on VLAN. The present invention utilizes the detection of MAC address of network device to dynamically setting and adjusting the VLAN configuration information record stored in a switch, so as to resolve the problems of the conventional technologies.

In accordance with the aforementioned object of the present invention, the present invention provides a method of setting network configuration, and the device and system thereof, which can be utilized in a switch supporting VLAN. The switch has a plurality of ports, and stores a VLAN configuration information record comprising a plurality of MAC addresses. According to the present invention, the method of setting network configuration comprises: detecting and obtaining a MAC address of network device connected to a port of the switch; and comparing the MAC address of network device to that in the VLAN configuration information record, wherein, if the MAC address of network device is the same as one of the several MAC addresses listed in the VLAN configuration information record, then using the port associated with the network device on the switch to replace the port where the MAC address is located as indicated in the VLAN configuration information record; and if the MAC address of network device is not the same as any of the several MAC addresses listed in the VLAN configuration information record, then linking and inserting the MAC address and the information of the port associated with the network device into the VLAN configuration information record.

Moreover, the present invention also provides a switch, the switch comprising: a storing device having a VLAN configuration information record; and a control device having the functions comprising: detecting a plug and pull signal of each port on the switch, and obtaining a MAC address designated to a network device connected to each port; comparing the MAC address to that listed in the VLAN configuration information record; and performing an updating step in accordance with the comparison result, wherein, if the comparison result shows that the MAC address does not exist in the VLAN configuration information record, then writing the MAC address and its corresponding port information into the VLAN configuration information record; and if the MAC address exists in the VLAN configuration information record, then writing the newly-detected MAC address and its corresponding port information into the VLAN configuration information record, so as to replace the old record in the VLAN configuration information record.

The VLAN system provided by the present invention comprises: a network connecting device having a plurality of ports; at least one VLAN, wherein the VLAN comprising: a network device having a MAC address, the network device being coupled to one of the several ports of network connecting device; a storing device having at least one VLAN configuration information record; and a control device having the functions comprising: detecting a plug and pull signal of each port on the switch, and obtaining a MAC address designated to a network device connected to each port; comparing the MAC address to that listed in the VLAN configuration information record, so as to obtain a comparison result; and performing an updating step in accordance with the comparison result, wherein, if the comparison result shows that the MAC address does not exist in the VLAN configuration information record, then writing the MAC address and its corresponding port information into the VLAN configuration information record; and if the MAC address exists in the VLAN configuration information record, then writing the newly-detected MAC address and its corresponding port information into the VLAN configuration information record, so as to replace the old record in the VLAN configuration information record.

In the VLAN of the present invention, the aforementioned storing device and control device can be built inside the network connecting device or any other network device, wherein the network connecting device or network device can be a switch, a bridge, a router, a hub or a network terminal device, etc.

By means of the method of setting network configuration according to the present invention, the VLAN configuration information record stored in the switch can be dynamically adjusted and set, so as to maintain and manage the VLAN conveniently.

BRIEF DESCRIPTION OF THE DRAWINGS

The foregoing aspects and many of the attendant advantages of this application will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
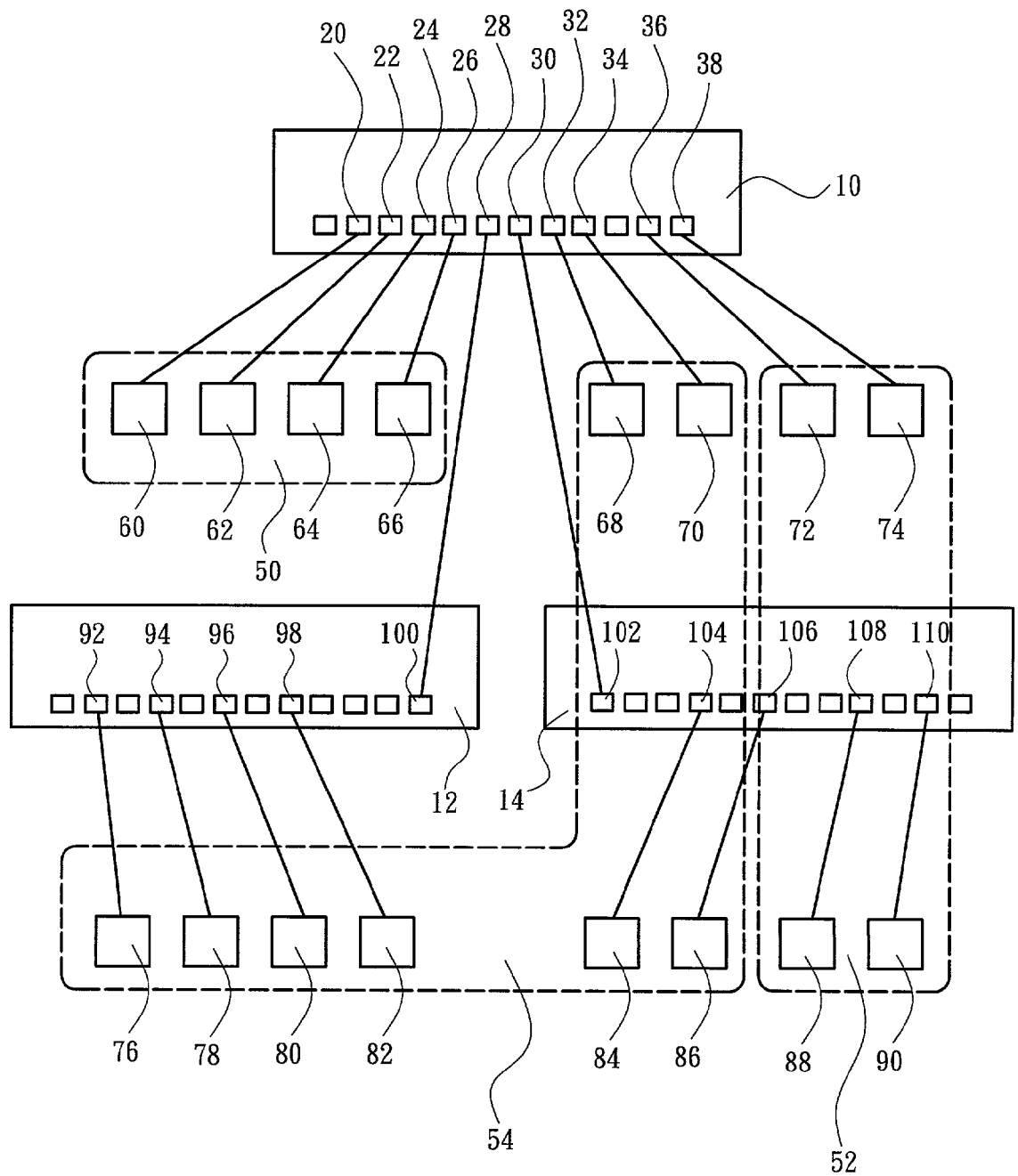
FIG. 1 is a schematic diagram showing conventional port-based VLANs.
Figure 2:
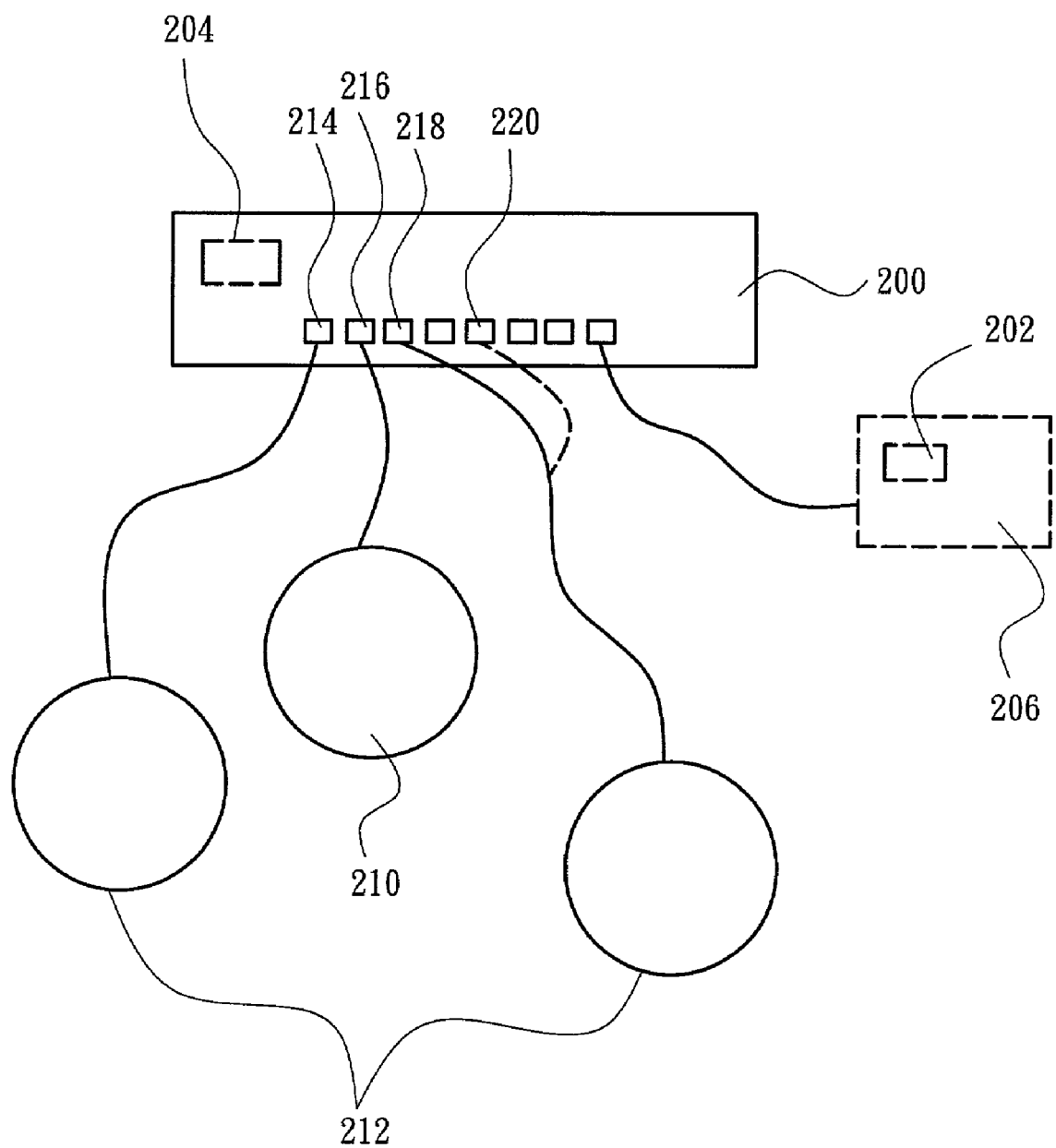
FIG. 2 is a schematic diagram showing conventional MAC-based VLANs.
Figure 3:
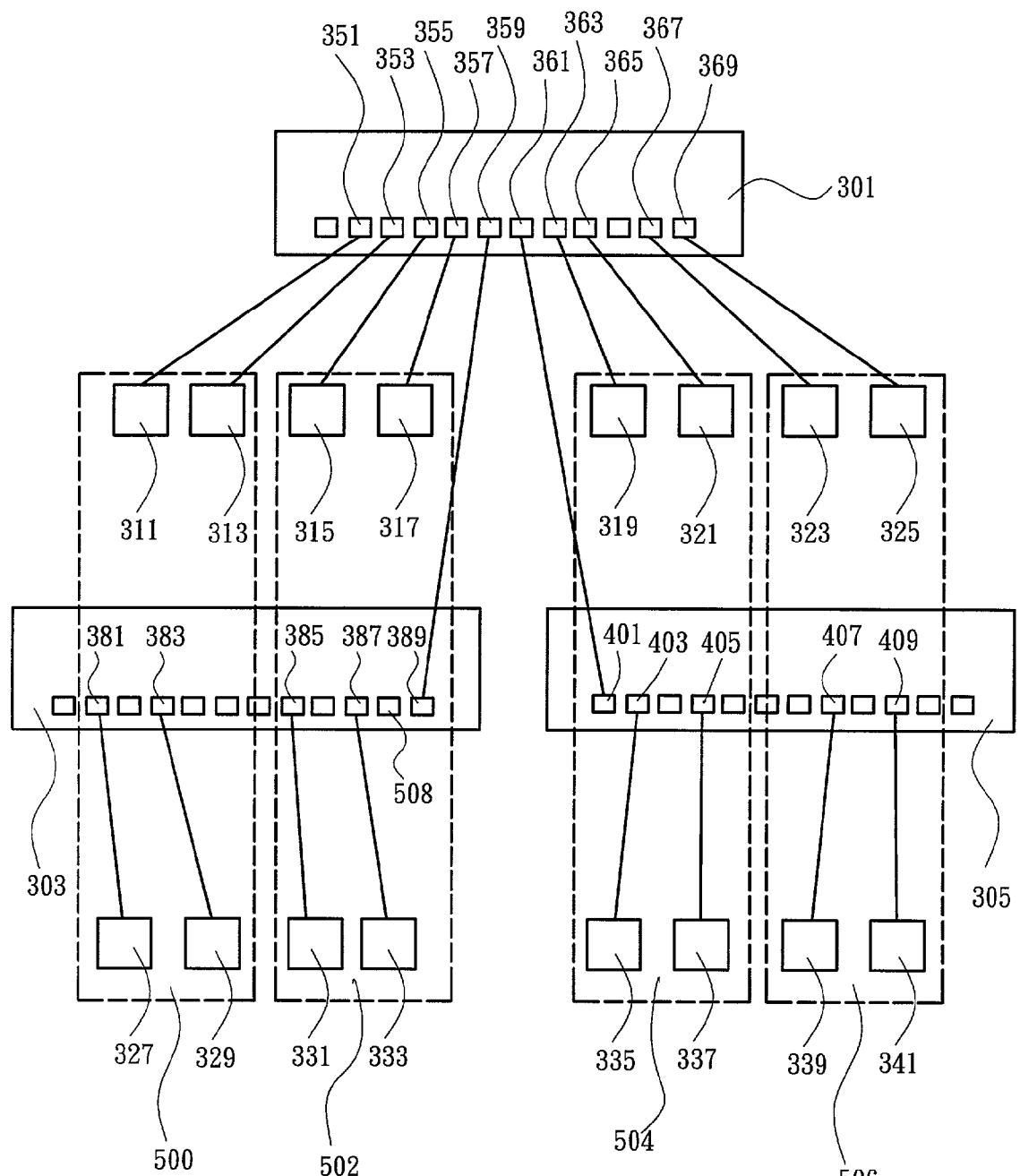
FIG. 3 is a schematic diagram of MAC-based VLANs using a preferred embodiment of the present invention.

FIG. 3 is a schematic diagram of MAC-based VLANs using a preferred embodiment of the present invention. Such as shown in FIG. 3, VLANs 500, 502, 504 and 506 are mutually connected via network connecting devices 301, 303 and 305, wherein a sixth port 359 of the network connecting device 301 is connected to a twelfth port 389 of the network connecting device 303, and a seventh port 361 of the network connecting device 301 is connected to a first port 401 of the network connecting device 305.

VLAN 500 is composed of a network device 311 connected to a second port 351 and a network device 313 connected to a third port 353, wherein both of the second port 351 and the third port 353 are located on the network connecting device 301; a network device 327 connected to a second port 381 and a network device 329 connected in a fourth port 383, wherein both of the second port 381 and the fourth port 383 are located on the network connecting device 303. VLAN 502 is composed of a network device 315 connected to a fourth port 355 and a network device 317 connected to a fifth port 357, wherein both of the fourth port 355 and the fifth port 357 are located on the network connecting device 301; a network device 331 connected to an eighth port 385 and a network device 333 connected to a tenth port 387, wherein both of the eighth port 385 and the tenth port 387 are located on the network connecting device 303. VLAN 504 is composed of a network device 319 connected to an eighth port 363 and a network device 321 connected to a ninth port 365, wherein both of the eighth port 363 and the ninth port 365 are located on the network connecting device 301; a network device 335 connected to a second port 403 and a network device 337 connected to a fourth port 405, wherein both of the second port 403 and the fourth port 405 are located on the network connecting device 305. VLAN 506 is composed of a network device 323 connected to an eleventh port 367 and a network device 325 connected to a twelfth port 369, wherein both of the eleventh port 367 and the twelfth port 369 are located on the network connecting device 301; a network device 339 connected to an eighth port 407 and a network device 341 connected to a tenth port 409, wherein both of the eighth port 407 and the tenth port 409 are located on the network connecting device 305.

When the port associated with the network device 319 in VLAN 504 is switched from the eighth port 363 of the network connecting device 301 to the eleventh port 508 of the network connecting device 303, by applying the method of setting network configuration, and the device and system thereof according to the present invention, the network connecting device 303 can directly or indirectly obtain a MAC address of the network device 319 located on the eleventh port 508. After the network connecting device 303 compares the MAC address to its VLAN configuration information record, it can be found that the MAC address of the network device 319 is originally located on the eighth port 363 of the network connecting device 301, while the eighth port 363 of the network connecting device 301 is connected to the VLAN 504. Accordingly, via the address automatic learning system, the network connecting device 303 can then base on the current status showing that the MAC address of the network device 319 is designated to the eleventh port 508 of the network connecting device 303, so as to add the eleventh port 508 to the layout of VLAN 504 in the VLAN configuration information record. Thereafter, in the VLAN configuration information record, the eleventh port 508 is used to replace the eighth port 363 (to which the MAC address of the network device 319 is originally designated), thus updating the VLAN configuration information record.

Figure 4:
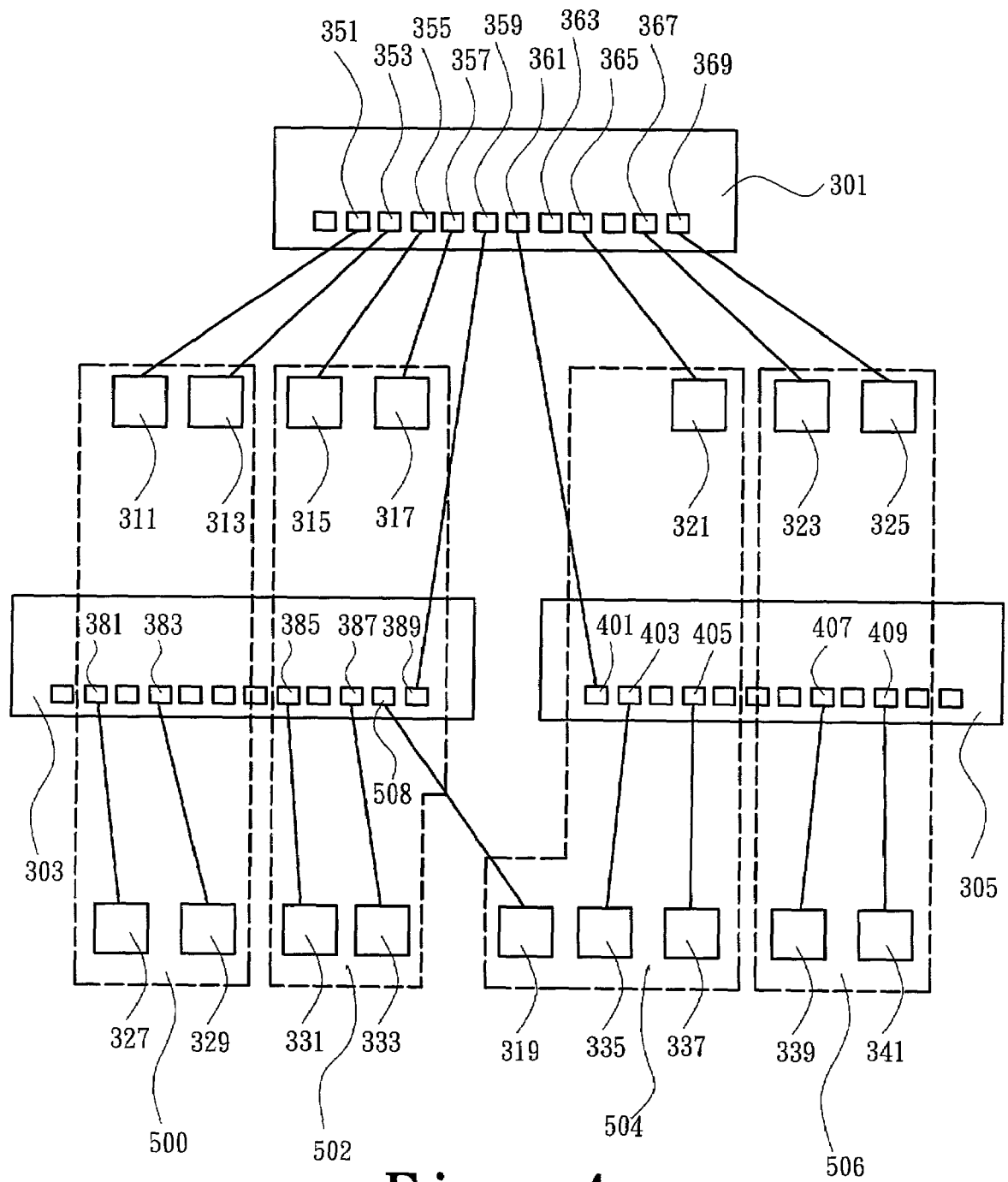
FIG. 4 is a schematic diagram of MAC-based VLANs using the other preferred embodiment of the present invention.

As to the layout of VLANs after replacement, please refer to FIG. 4, which is FIG. 4 is a schematic diagram of MAC-based VLANs using the other preferred embodiment of the present invention. It can be known from FIG. 4 that the network device 319 is connected to the eleventh port 508 of the network connecting device 303, and still belongs to the VLAN 504. Similarly, the network connecting devices 301 and 305 also perform the same steps as described above, i.e. obtaining a MAC address of the network device 319 located on the eleventh port 508 of the network connecting device 303; comparing the MAC address of the network device 319 to its VLAN configuration information record; then adding the eleventh port 508 to the VLAN configuration information record, wherein the eleventh port 508 is used in network connecting device 303 for connecting the network device 319; then, in the VLAN configuration information record, replacing the eighth port 363 (the MAC address is originally designated to the eight port 363 of the network connecting device 301) with the eleventh port 508, thus updating the VLAN configuration information record.

Hence, when any network device in FIG. 4 desires to access the resource of the network device 319, the eleventh port 508 of the network connecting device 303 is used as an accessing path.

Figure 5:
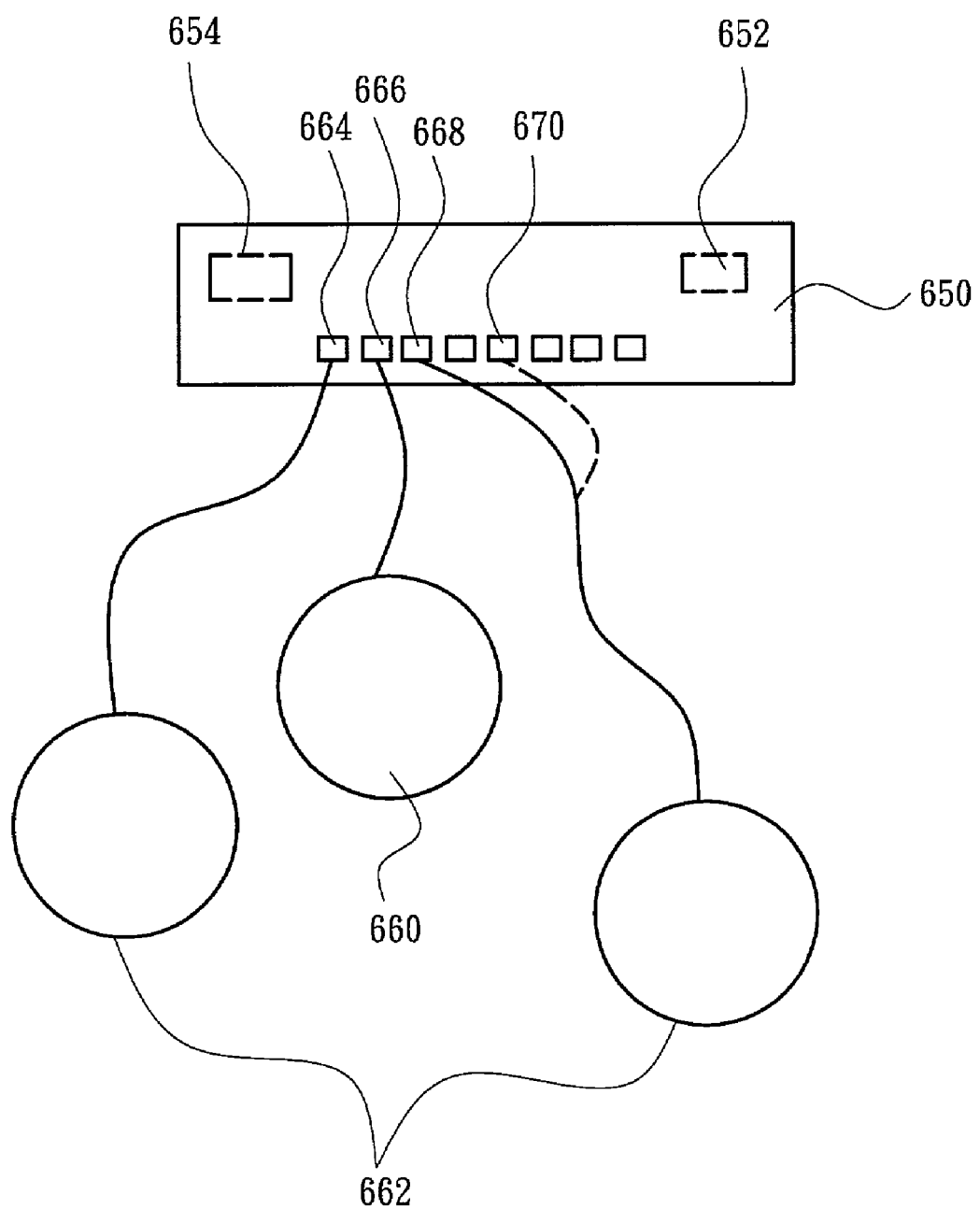
FIG. 5 is a schematic diagram of a switch enabled in accordance with the method of setting network configuration according to the present invention.

Referring to FIG. 5, FIG. 5 is a schematic diagram of a switch enabled in accordance with the method of setting network configuration according to the present invention. In MAC-based VLANs, a VLAN 660 and a VLAN 662 are linked to each other by means of a switch 650 of the present invention, and the switch 650 has a control device 652 and a storing device 654, wherein the storing device 654 is used for storing the configuration information concerning the VLAN 660 and the VLAN 662, and the control device 652 is used for controlling the internal and external operations of the switch 650.

On the other hand, the initial settings in the VLAN configuration information record are: the VLAN 660 comprising twenty network devices connected to a second port 666 on the switch 650, each of the twenty network devices having a different MAC address, which is from MAC21 to MAC40; the VLAN 662 comprising twenty network devices connected to a first port 664 on the switch 650, the MAC addresses of those twenty network devices being from MAC1 to MAC20; and the VLAN 662 further comprises twenty network devices connected to a third port 668 on the switch 650, the MAC addresses of those twenty network devices being from MAC41 to MAC60, so that the VLAN 662 has forty network devices in total.

In FIG. 5, the switch 650 can make a proper setting on the control device 652 by a user, thereby determining whether the plug and pull signal on each of the ports on the switch 650 should be detected. Thus, when the twenty network devices originally connected to the third port 668 on the switch 650 are switched to a fifth port 670 on the switch 650, the control device 652 first detects the plug and pull signal on the third port 668, and thereafter detects the plug and pull signal on the fifth port 670, and obtains by direct detection MAC addresses (i.e. from MAC41 to MAC60) of all the network devices connected to the fifth port 670, or obtains those MAC addresses indirectly from the signals sent while the network devices (i.e. the twenty network devices of MAC41 to MAC60) are replaced.

After the control device 652 obtains the MAC addresses of all the network devices connected to the fifth port 670, the control device 652 compares the twenty MAC addresses from MAC41 to MAC60 designated to the fifth port 670 to the VLAN configuration information record stored in the storing device 654, and then performs the subsequent step in accordance with the comparison result. In a preferred embodiment as shown in FIG. 5, the twenty network devices originally connected to the third port 668 on the switch 650 are switched to the fifth port 670 on the switch 650. Therefore, according to the MAC address of each of the network devices, it can be known by comparison that the twenty network devices currently connected to the fifth port 670 are originally connected to the third port 668, and also can be known that the third port 668 belongs to the VLAN 662, and the twenty port having the addresses from MAC41 to MAC60 originally belong to the VLAN 662.

Thereafter, the control device 652 can use the address automatic learning function to perform a comparing and updating step automatically on the VLAN configuration information record stored in the storing device 654, according to the MAC address on each of the ports. Since the twenty ports having the addresses from MAC41 to MAC60 have been alternatively connected to the fifth port 670 from the third port 668, the control device 652 first adds the fifth port 670 to the VLAN 662 listed the VLAN configuration information record, and then replaces the third port 668 to which MAC41 to MAC60 are originally designated with the fifth port 670 currently associated with those MACs, thereby updating the layout of the VLAN 662. Therefore, when any network device in the VLAN 660 or the VLAN 662 desires to access the network device belonging to any one of the MAC addresses from MAC41 to MAC60 in the VLAN 662, the switch 650 will base on the updated VLAN configuration information record (i.e. in the VLAN 662, MAC41 and MAC60 are designated to the fifth port 670 on the switch 650.) to access the network device whose MAC address is one of the MAC addresses from MAC41 to MAC60.

In the preferred embodiment as shown in FIG. 5, it is merely described the condition that the twenty network devices originally connected to the third port 668 on the switch 650 are switched to the fifth port 670 on the switch 650. With regard to the other conditions, such as that the twenty network devices originally connected the third port 668 on the switch 650 are switched to a port located on another network device, or that the twenty network devices are directly pulled out of the third port 668 on the switch 650, the present invention also can perform the corresponding comparison treatment, thereby updating the VLAN configuration information record, so that the VLAN 660 and the VLAN 662 can maintain a certain degree of reliability.

Hence, it is an advantage of the present invention to provide a method of setting network configuration setting, and the device and system thereof. While applied on a VLAN, the method of setting network configuration according to the present invention can be used to allow a network device supporting the VLAN function to set, adjust and update the VLAN configuration information record stored in the switch, by means of detecting the plug and pull signal on each of the ports and also in accordance with the MAC addresses of other network devices connected to the ports of the switch, thereby conveniently maintaining and managing the VLANs.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A method of setting network configuration, comprising:
    obtaining a first MAC (Media Access Control) address of a first network device connected to a first port;
    comparing said first MAC address to a VLAN (Virtual Local Area Network) configuration information record, thereby obtaining a comparison result; and
    performing an updating step on said VLAN configuration information record in accordance with said comparison result, wherein if said comparison result shows that said first MAC address is the same as a second MAC address corresponding a second port located in said VLAN configuration information record, then in said VLAN configuration information record, said updating step is to replace said second MAC address and the information of said second port with said first MAC address and the information of said first port.

2. The method of setting network configuration according to claim 1, wherein said first MAC address on said first port is obtained by detecting a first plug and pull signal on said first port.

3. The method of setting network configuration according to claim 2, wherein whether said first plug and pull signal on said first port is detected is determined by a user.

4. The method of setting network configuration according to claim 1, wherein if said comparison result shows that said first MAC address does not exist in said VLAN configuration information record, then said updating step is to write said MAC address and the information of said first port into said VLAN configuration information record.

5. The method of setting network configuration according to claim 1, wherein said updating step comprises:
    adding said first port to said VLAN configuration information record belonging to a VLAN to which said second MAC address belongs; and
    replacing said second port with said first port, and said second MAC address with said first MAC address.

6. The method of setting network configuration according to claim 1, wherein, before obtaining said first MAC address on said first port, said method of setting network configuration further comprising:
    obtaining a third MAC address of another network device connected to a third port; and
    designating said third port to a pre-determined VLAN listed in said VLAN configuration information record.

7. The method of setting network configuration according to claim 6, wherein said pre-determined VLAN is determined by a user and comprises said third MAC address.

8. A switch, wherein said switch is applied on a VLAN, and is used for connecting a plurality of network devices, said switch comprising:
    a storing device, wherein said storing device has a VLAN configuration information record; and
    a control device, said control device comprising the functions of:
        detecting a first plug and pull signal on a first port in said switch;
        obtaining a first MAC address of a first network device connected to said first port;
        comparing said first MAC address to said VLAN configuration information record, thereby obtaining a comparison result; and
        performing an updating step on said VLAN configuration information record in accordance with said comparison result, wherein if said comparison result shows that said first MAC address is the same as a second MAC address corresponding a second port located in said VLAN configuration information record, then in said VLAN configuration information record, said updating step is to replace said second MAC address and the information of said second port with said first MAC address and the information of said first port.

9. The switch of claim 8, wherein whether said control device detects said first and pull signal on said first port in said switch is determined by a user.

10. The switch of claim 8, wherein if said comparison result shows that said first MAC address does not exist in said VLAN configuration information record, then said updating step is to write said MAC address and the information of said first port into said VLAN configuration information record.

11. The switch of claim 8, wherein said control device performs said updating step on said VLAN configuration information record in accordance with said comparison result, said updating step comprising:

adding said first port to said VLAN configuration information record of a VLAN to which said second MAC address belongs; and replacing said second port with said first port, and said second MAC address with said first MAC address.

12. A VLAN system, comprising:

a network connecting device having a plurality of ports;

at least one VLAN, comprising:

a first network device, wherein said first network device has a first MAC address, and is coupled to a first port of said plurality of ports;

a storing device, wherein said storing device having at least one VLAN configuration information record of said at least one VLAN; and a control device, said control device comprising the functions of:

detecting a first plug and pull signal on a said first port on a switch;

obtaining said first MAC address of said first network device connected to said first port;

comparing said first MAC address to said VLAN configuration information record, thereby obtaining a comparison result; and performing an updating step on said VLAN configuration information record in accordance with said comparison result, wherein if said comparison result shows that said first MAC address is the same as a second MAC address corresponding a second port located in said VLAN configuration information record, then in said VLAN configuration information record, said updating step is to replace said second MAC address and the information of said second port with said first MAC address and the information of said first port.

13. The VLAN of claim 12, wherein said storing device and said control device are built inside said network connecting device.

14. The VLAN of claim 12, wherein said storing device and said control device are built inside said first network device.

15. The VLAN of claim 12, wherein, whether said control device detects said first and pull signal on said first port in said switch is determined by a user.

16. The VLAN of claim 12, wherein if said comparison result shows that said first MAC address does not exist in said VLAN configuration information record, then said updating step is to write said first MAC address and the information of said first port into said VLAN configuration information record.

17. The VLAN of claim 12, wherein said control device performs said updating step on said VLAN configuration information record in accordance with said comparison result, said updating step comprising:

adding said first port to said at least one VLAN configuration information record of said at least one VLAN to which said second MAC address belongs; and replacing said second port with said first port, and said second MAC address with said first MAC address.

* * * * *